US010654307B2

(12) United States Patent
Garnier et al.

(10) Patent No.: US 10,654,307 B2
(45) Date of Patent: May 19, 2020

(54) ROTOGRAVURE PRINTING PROCESSES FOR PRODUCING OPTICALLY VARIABLE SECURITY FEATURES

(71) Applicant: SICPA HOLDING SA, Prilly (CH)

(72) Inventors: Christophe Garnier, Reignier (FR); Lucien Vuilleumier, Begnins (CH); Cecile Pasquier, Marly (CH)

(73) Assignee: SICPA HOLDING SA, Prilly (CH)

( * ) Notice: Subject to any disclaimer, the term of this patent is extended or adjusted under 35 U.S.C. 154(b) by 327 days.

(21) Appl. No.: 15/029,660

(22) PCT Filed: Oct. 9, 2014

(86) PCT No.: PCT/EP2014/071665
§ 371 (c)(1),
(2) Date: Apr. 15, 2016

(87) PCT Pub. No.: WO2015/055504
PCT Pub. Date: Apr. 23, 2015

(65) Prior Publication Data
US 2016/0263931 A1    Sep. 15, 2016

(30) Foreign Application Priority Data
Oct. 17, 2013   (EP) ..................................... 13189087

(51) Int. Cl.
*B42D 25/364* (2014.01)
*C09K 19/38* (2006.01)
(Continued)

(52) U.S. Cl.
CPC ............ *B42D 25/364* (2014.10); *B41F 11/02* (2013.01); *B41M 3/148* (2013.01); *B42D 25/23* (2014.10);
(Continued)

(58) Field of Classification Search
CPC ...... B42D 25/364; B42D 25/29; B42D 25/44; B42D 25/355; B42D 25/23; B41F 11/02;
(Continued)

(56) References Cited

U.S. PATENT DOCUMENTS 6,136,225 A   10/2000 Meyer et al.
6,589,445 B2   7/2003 Sugiyama et al.
(Continued)

FOREIGN PATENT DOCUMENTS

CN    101930141    12/2010
CN    102935769    2/2013
(Continued)

OTHER PUBLICATIONS

Chinese office action and Search Report in counterpart Chinese Application No. 201480056898.2 dated Sep. 29, 2017 (and English language translation).
(Continued)

*Primary Examiner* — Justin V Lewis
(74) *Attorney, Agent, or Firm* — Muncy, Geissler, Olds & Lowe, P.C.

(57) ABSTRACT

The present invention is related to the filed of optically variable security elements comprising a region based on a single cured ink comprising a cholesteric liquid crystal polymer, said region having at least two, preferably at least three, patterns exhibiting, at at least one viewing angle, a different CIE (1976) color index parameter and/or a different position of the selective reflection band for protecting security documents against counterfeiting and/or illegal reproduction. In particular, the present invention relates to processes for manufacturing said features, when the processes comprises the steps of a) applying on a substrate by a rotogravure process with the use of a gravure cylinder having at least two, preferably at least three, different
(Continued)

engravings a single cholesteric liquid crystal precursor composition, b) heating the applied composition to bring said composition to a cholesteric liquid crystal state, and c) curing the composition so as to form the region based on a single cured ink comprising a cholesteric liquid crystal polymer.

11 Claims, 1 Drawing Sheet

(51) Int. Cl.
| | |
|---|---|
| *B41M 3/14* | (2006.01) |
| *C09K 19/58* | (2006.01) |
| *C09D 11/03* | (2014.01) |
| *B42D 25/23* | (2014.01) |
| *B42D 25/29* | (2014.01) |
| *B42D 25/355* | (2014.01) |
| *B42D 25/44* | (2014.01) |
| *B41F 11/02* | (2006.01) |
| *C09K 19/34* | (2006.01) |
| *B41M 1/10* | (2006.01) |
| *C09K 19/04* | (2006.01) |

(52) U.S. Cl.
CPC .......... *B42D 25/29* (2014.10); *B42D 25/355* (2014.10); *B42D 25/44* (2014.10); *C09D 11/03* (2013.01); *C09K 19/3809* (2013.01); *C09K 19/3861* (2013.01); *C09K 19/588* (2013.01); *B41M 1/10* (2013.01); *C09K 2019/0448* (2013.01); *C09K 2019/3408* (2013.01)

(58) Field of Classification Search
CPC .............. C09K 19/3809; C09K 19/588; C09K 19/3861; C09K 2019/3408; C09K 2019/0448; C09D 11/03; B41M 3/148; B41M 1/10
USPC ............................ 283/67, 70, 72, 74, 94, 98
See application file for complete search history.

(56) References Cited

U.S. PATENT DOCUMENTS

| | | |
|---|---|---|
| 7,033,653 B2 | 4/2006 | Kuntz et al. |
| 2007/0224341 A1 | 9/2007 | Kuntz et al. |
| 2008/0001121 A1 | 1/2008 | Tanabe |
| 2009/0174914 A1* | 7/2009 | Pinchen ................. B41F 9/003 358/474 |
| 2013/0029169 A1* | 1/2013 | Hammond-Smith ........................ B05D 5/061 428/537.5 |

FOREIGN PATENT DOCUMENTS

| | | |
|---|---|---|
| EP | 0847432 | 6/2001 |
| EP | 2056134 | 5/2009 |
| JP | 0858224 | 3/1996 |
| JP | 2008031425 | 2/2008 |
| JP | 2012523031 | 9/2012 |
| WO | 1993022397 | 11/1993 |
| WO | 1995022586 | 8/1995 |
| WO | 2002085642 | 10/2002 |
| WO | 2007138255 | 12/2007 |
| WO | 2010115879 | 10/2010 |
| WO | 2011120620 | 10/2011 |
| WO | 2012076533 | 6/2012 |
| WO | 2012076534 | 6/2012 |

OTHER PUBLICATIONS

CIE (1976) color index parameters.
Coloristik für Lackanwendungen, Tasso Bäurle et al., Farbe and Lack Edition, 2012, ISBN 978-3-86630-869-5.
"Handbook of print media", Helmut Kipphan, Springer Edition, pp. 360-394.
Rotogravure and flexographic printing presses, Herbert L. Weiss, Converting Technology Corp., 1985, pp. 48-52.
International Search Report and Written Opinion issued with respect to application No. PCT/EP2014/071665.
International Preliminary Report on Patentability issued with respect to application No. PCT/EP2014/071665.
Japanese office action in counterpart Japanese Application No. 2016-515510 dated Aug. 21, 2018 (along with English language translation).

* cited by examiner

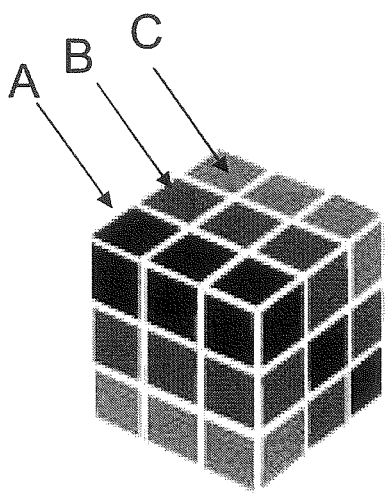

ROTOGRAVURE PRINTING PROCESSES FOR PRODUCING OPTICALLY VARIABLE SECURITY FEATURES

FIELD OF THE INVENTION

The present invention relates to the field of optically variable security elements made of cholesteric liquid crystal materials for protecting security documents against counterfeiting and/or illegal reproduction. In particular, the present invention relates to cholesteric liquid crystal materials to be used in rotogravure printing processes for the printing of security documents, in order to obtain specific security elements.

BACKGROUND OF THE INVENTION

With the constantly improving quality of color photocopies and printings, and in an attempt to protect security documents such as banknotes, value documents or cards, transportation tickets or cards, tax banderols, and product labels that have no reproduceable effects against counterfeiting, falsifying or illegal reproduction, it has been the conventional practice to incorporate various security elements in these documents. Typical examples of security elements include security threads, windows, fibers, planchettes, foils, decals, holograms, watermarks, security inks comprising optically variable pigments, magnetic or magnetizable thin-film interference pigments, interference-coated particles, thermochromic pigments, photochromic pigments, luminescent, infrared-absorbing, ultraviolet-absorbing or magnetic compounds.

Colorshifting elements (also referred in the art as optically variable elements or goniochromatic elements) exhibit a viewing-angle or incidence-angle dependent color, and are used to protect banknotes and other security documents against counterfeiting and/or illegal reproduction by commonly available color scanning, printing and copying office equipment.

Materials having a liquid crystal structure with a chiral phase, also known as cholesteric liquid crystal materials, are known and used as optically variable elements.

Cholesteric liquid crystal polymers show a molecular order in the form of a helical super-structure perpendicular to the longitudinal axes of its molecules. The helical superstructure provides for a periodic refractive index modulation throughout the liquid crystal material, which in turn results in a selective transmission/reflection of determined wavelengths of light (interference filter effect). Cholesteric liquid crystal polymers can be obtained by subjecting one or more crosslinkable substances (nematic compounds) with a chiral phase to alignment and orientation. The particular situation of the helical molecular arrangement leads to cholesteric liquid crystal materials exhibiting the property of reflecting a circularly polarized light component within a determined wavelength range, wherein said circularly polarized light may be left-handed or right-handed, depending on the sense of rotation of the molecular helices. The range of wavelengths reflected by a cholesteric liquid crystal polymer is determined by the geometry of its periodic refractive index modulation, i.e. the pitch of the molecular helices, as known to the skilled man. The pitch (i.e. the distance over which a full rotation of 360° of the helical arrangement is completed) can be tuned in particular by varying selectable factors including the temperature and solvents concentration, by changing the nature of the chiral component(s) and the ratio of nematic and chiral compounds. The pitch of the material can finally be frozen by a cross-linking (polymerization) reaction, such that the color of the resulting cholesteric liquid crystal polymer is no longer depending on external factors such as the temperature.

The range of colorshifts of cholesteric liquid crystal polymers available for security documents might be limited, and with the aim of increasing the color gamut of cholesteric liquid crystal polymers, it can be of advantage to modify the reflection characteristics and thereby increasing the range of available colors.

As mentioned above, the reflected light from a cholesteric liquid crystal polymer depends on the pitch of its helical structure and is thereby dependent on the nature and the concentration of the chiral component(s). In particular, adding an appropriate quantity of the chiral component(s) to the precursor mixture results in a colorshift modification to shorter wavelengths. However, it is neither straightforward nor cost-effective to customize the cholesteric liquid crystal material during manufacture for each specific application and for each desired colorshift effect. Moreover, the fine-tuning of colorshift properties of cholesteric liquid crystal polymers is a delicate step often resulting in an important waste of time and/or material.

US 2007/0224341 discloses a method in which a chiral liquid-crystal layer is brought into contact with an extraction medium (extractant) by coating or printing methods in such a way that diffusion of substances out of the liquid-crystal layer into the extractant occurs. The disclosed method comprises the steps of i) applying a first layer of a polymerizable or curable chiral liquid crystal material to a support, ii) partially or completely polymerize or cure the first layer of the polymerizable chiral liquid-crystal material, iii) apply at least one further layer of one or more extraction media to the partially or fully polymerized or cured first liquid-crystal layer, and, iv) where appropriate, completely polymerize or cure the first liquid-crystal layer and/or one or more of the further layers.

WO 2007/138255 A1 discloses a method of forming a customizable security device comprising the steps of forming on a substrate a liquid crystal layer, an at least partially absorbing layer overlapping with at least a part of one side of the liquid crystal layer, and at least one customizing region overlapping at least a part of an opposite side of the liquid crystal layer in selected regions. The customizing region modifies the colorshifting properties of the liquid crystal layer, and this modification is apparent to the observer as a change in the angle of view at which the different colors are observed.

U.S. Pat. No. 7,033,653 discloses a birefringent marking comprising a liquid crystal material having discrete regions with different thickness, said marking being prepared by applying droplets of a solution of a liquid crystal material to a substrate and allowing the solvent to evaporate. However, the disclosed method may suffer from a poor reproducibility since the thickness of the liquid crystal layer can be easily altered.

WO 2012/076533 A1 discloses a method of changing a position of a selective reflection band exhibited by a chiral liquid crystal precursor composition in a cured state. The disclosed method comprises a step of incorporating in the precursor composition at least one salt that is capable of changing a position of a selective reflection band exhibited by the precursor composition in a cured state.

WO 2012/076534 A1 discloses a method changing a position of a selective reflection band exhibited by a cured chiral liquid crystal precursor composition comprising (i) one or more nematic compounds, (ii) one or more chiral dopant compounds which are capable of giving rise to a cholesteric state of the cured composition, and (iii) at least one salt that changes a position of a selective reflection band exhibited by the cured composition compared to a position of a selective reflection band exhibited by a cured composition that does not contain the at least one salt. The disclosed method comprises a step of contacting the composition with a modifying resin which is made from one or more polymerizable monomers, at least one of the monomers comprising a heteroatom selected from O, N, and S, and is capable of changing a position of a selective reflection band exhibited by the cured chiral liquid crystal precursor composition comprising the at least one salt.

US 2013/0029169 discloses a method of producing multicolored coatings on substrates using two different liquid crystalline coating compositions, said multicolored coating exhibiting at least three different colors. The disclosed method consists of coating a first coating composition containing a first polymerizable nematic liquid crystal material onto a substrate and subsequently coating a second coating composition containing a second polymerizable nematic liquid crystal material onto the substrate while the first coating composition is still in an unpolymerized state, wherein the first and the second coating composition overlap in at least one defined area, followed by polymerization of the resulting coating.

Therefore, there remains a need for a method for producing multi-colored optically variable security feature based on cholesteric liquid crystal polymers in an easy, economic, improved, predictable, reproduceable and controlled manner.

SUMMARY

Accordingly, it is an object of the present invention to overcome the deficiencies of the prior art discussed above. This is achieved by the provision of a process for manufacturing an optically variable security feature and optically variable security features described thereof, said optically variable security feature comprising a region based on a single cured ink comprising a cholesteric liquid crystal polymer, said region having at least two, preferably at least three, patterns exhibiting, at at least one viewing angle, a different CIE (1976) color index parameter and/or a different position of the selective reflection band, said process comprising the steps of:
a) applying on a substrate, by a rotogravure process with the use of a gravure cylinder having at least two, preferably at least three, different engravings, a single cholesteric liquid crystal precursor composition,
b) heating the applied composition to bring said composition to a cholesteric liquid crystal state, and
c) curing the composition so as to form the region based on a single cured ink comprising a cholesteric liquid crystal polymer.

There are disclosed and claimed herein uses of a cylinder for a rotogravure printing process having at least two, preferably at least three, different engravings for producing the optically variable security described herein.

There are disclosed and claimed herein uses of the optically variable security feature described herein for the protection of a security document and security documents comprising said optically variable security feature.

There are disclosed and claimed herein a method for manufacturing a security document, comprising the step of providing the security document with an optically variable security feature as described herein.

A particularly advantageous property of the process given by the present invention resides in the ability to provide an easily tunable and predictable way of printing multi-colored optically variable security features with a single cholesteric liquid crystal precursor composition in a single printing step, thus reducing the complexity of conventional printing processes. The customization of the color and/or colorshifting properties of patterns comprising a cholesteric liquid crystal polymer benefits from a design flexibility, since a variety of patterns with different optical properties may be produced from a single composition which is applied in a single step. This enables the cholesteric liquid crystal materials to be produced in advance and later customized and/or finished during their application on the security documents comprising said optically variable security feature.

BRIEF DESCRIPTION OF DRAWINGS

FIG. 1 represent an example of an optically variable security feature produced according to the process according to the present invention which comprises a region based on a single cured ink comprising a cholesteric liquid crystal polymer, said region having three patterns (A, B and C) exhibiting, at at least one viewing angle, a different CIE (1976) color index parameter and a different position of the selective reflection band.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" mean that the amount or value in question may be the value designated or some other value about the same. The phrase is intended to convey that similar values within a range of ±5% of the indicated value promote equivalent results or effects according to the invention.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

As used herein, the term "comprise" or variations such as "comprises" or "comprising" will be understood to imply the inclusion of a stated feature, integer, step or component or group of features, integers, steps or components but does not preclude the presence or addition of one or more others features, integers, steps or components.

As used herein, the term "composition" refers to any composition which is capable of forming a coating on a solid substrate.

As used herein, the term "multi-colored security feature" refers to any security feature comprising two or more printed patterns exhibiting, at at least one viewing angle, a different CIE (1976) color index parameter and/or a different position of the selective reflection band.

As used herein, the term "selective reflection band" refers to the wavelength at which a pattern made from said single cured ink comprising said cholesteric liquid crystal polymer exhibits maximum reflectance ($\lambda_{max\ reflectance}$).

The optically variable security feature comprising a region based on a single colorshifting ink comprising a cholesteric liquid crystal polymer, said region having at least two, preferably at least three, patterns having different thicknesses, said at least two, preferably at least three, patterns exhibiting, at at least one viewing angle, a different CIE (1976) color index parameter and/or a different position of the selective reflection band ($\lambda_{max\ reflectance}$) is produced by a process comprising a step of applying on a substrate, by a rotogravure process with the use of a gravure cylinder having at least two, preferably at least three, different engravings, a single cholesteric liquid crystal precursor composition. When the region has at least two patterns, a gravure cylinder having at least two different engravings is used. When the region has at least three patterns, a gravure cylinder having at least three different engravings is used. The at least two patterns of the region described herein may be adjacent to each other or may be spaced apart. When the region described herein comprises at least three patterns, said three patterns may be adjacent to each other, may be spaced apart or may be disposed in a combined way (for example two patterns are adjacent to each other and the third one is spaced apart from one or both the two patterns).

As used herein, the term "different engravings" refers to engravings having different engraving parameters, such as cell characteristics and configurations, including, for example, the diagonal, the volume and the form of the engravings due to the manufacturing process used as described herein. The cell characteristics and configurations of the engravings have to be so different that the desired optically variable security feature comprising a region based on the cholesteric liquid crystal polymer, said region having at least two, preferably at least three, patterns exhibiting, at at least one viewing angle, a different CIE (1976) color index parameter and/or a different position of the selective reflection band, can be manufactured therewith.

The optically variable security feature, which is preferably obtained by the process described above, comprises a region based on a single cured ink comprising a cholesteric liquid crystal polymer, said region having at least two, preferably at least three, patterns exhibiting, at at least one viewing angle, a different CIE (1976) color index parameter and/or a different position of the selective reflection band. As used herein, the term "based on" means that the region of the optically variable security feature is made from one single cured ink, i.e. it has the same chemical composition throughout the entire region. The patterns within the region differ with respect to the specified optical characteristics, due to their application onto the substrate using different engravings of the printing cylinder.

As known in the art, dyes, pigments, coatings and layers may be characterized by their CIE (1976) color index parameters a*, b* and L*. The CIELab color space was defined by the Commission Internationale de l'Eclairage (CIE) in 1976 and represents a three-dimensional, rectangular coordinate system. The term "CIE (1976) parameters" is to be understood according to ISO 11664-4:2008. Some examples may be found in standard textbooks e.g "Coloristik für Lackanwendungen", Tasso Bäurle et al., Farbe and Lack Edition, 2012, ISBN 978-3-86630-869-5. The vertical coordinate L specifies the lightness of a color, the 2 horizontal coordinates a and b represent the hue and the saturation on red/green and blue/yellow axes respectively. According to one embodiment the at least two, preferably at least three, patterns described herein exhibit, at at least one viewing angle, a different CIE (1976) color index parameter. The different CIE (1976) color index parameters of a first pattern A and the second pattern B are characterized by their total color difference $\Delta E^*_{A-B}$. The $\Delta E^*_{A-B}$ value is calculated according to the following equation:

$$\Delta E^*_{A-B} = ((L^*_B - L^*_A)^2 + (a^*_B - a^*_A)^2 + (b^*_B - b^*_A)^2)^{1/2}$$

with the parameters
$L^*_A$ representing the CIE (1976) L* value of the component A
$L^*_B$ representing the CIE (1976) L* value of the component B
$a^*_A$ representing the CIE (1976) a* value of the component A
$a^*_B$ representing the CIE (1976) a* value of the component B
$b^*_A$ representing the CIE (1976) b* value of the component A
$b^*_B$ representing the CIE (1976) b* value of the component B Preferably, the region described herein comprises at least two, preferably at least three, patterns having a $\Delta\lambda_{max\ reflectance}$ (i.e. the difference of the selective reflection band) of at least 5 nm, more preferably at least 10 nm, and/or a $\Delta E^*_{A-B}$ (total color difference) of at least about 3 and more preferably at least about 4 at at least one viewing angle. The $\Delta E^*_{A-B}$ values defined above are measured with a spectrophotometer SF 300 from Datacolor. Measurements are performed with a dual-beam spectrophotometer with geometry diffuse illuminator/detection at 8° (sphere diameter: 66 mm; BaSO$_4$ coated, light source: pulsed Xenon, filtered to approximate D65 (standard Observer 10°)).

Colorshifting elements (also referred in the art as goniochromatic elements or optically variable elements) exhibit a viewing-angle or incidence-angle dependent color, and are used to protect banknotes and other security documents against counterfeiting and/or illegal reproduction by commonly available color scanning, printing and copying office equipment. For example, colorshifting coatings or layers exhibits a colorshift upon variation of the viewing angle (e.g. from a viewing angle of about 90° with respect to the plane of the coating or layer to a viewing angle of about 22.5° with respect to the plane of the coating or layer) from a color impression CI1 (e.g. green) to a color impression CI2 (blue). In addition to the overt security provided by colorshifting properties, which allows an easy detection, recognition and/or discrimination of the security elements or security documents comprising said elements from their possible counterfeits with the unaided human senses, the colorshifting properties may be used as a machine readable tool for the recognition of said security elements or security documents.

It also is to be appreciated that the present invention is not limited to the visible range of the electromagnetic spectrum. For example, one or more of the at least two, preferably at least three, patterns described herein may exhibit, at at least one viewing angle, a different position of the selective reflection band and/or a different CIE (1976) color index parameter in the visible, IR (infrared) or UV (ultraviolet) ranges and/or colorshifting properties from the visible range to the IR range, or from the UV range to the visible range, or from the UV range to the IR range; wherein the IR, visible and UV portions of the electromagnetic spectrum approximately correspond to the wavelength ranges between 700-2500 nm, 400-700 nm, and 200-400 nm, respectively.

As known by those skilled in the art, the term rotogravure refers to a printing process which is described for example in "Handbook of print media", Helmut Kipphan, Springer Edition, pages 360-394. Rotogravure is a printing process wherein the image or pattern elements are engraved into the surface of the gravure cylinder. The printing assembly further comprises an impression roller. The term rotogravure does not encompass intaglio printing processes (also referred in the art as engraved steel die or copper plate printing processes) which rely for example on a different type of ink. The non-image areas are at a constant original level. Prior to printing, the entire printing plate (non-printing and printing elements) is flooded with ink. The image or pattern consists of cells (or wells) engraved into the gravure cylinder, i.e. the engravings. The excess of ink in the non-image area is removed by a wiper or a blade before printing, so that ink remains only in the recessed cells. The image or pattern is transferred from the recessed cells to the substrate by a combination of pressure typically in the range of 1 to 4 bars, capillarity and by the adhesive forces between the substrate and the ink. Typically, gravure cylinders have a copper surface which may be covered with a thin layer of chrome, the copper carrying the image and the chrome protecting it. The basic functions of the copper are engravability, stability and reproducibility. Chrome serves as a protective layer against the friction of the doctor blade and the substrate, thus increasing the lifetime and lifecycle of said gravure cylinder.

The at least two, preferably at least three, patterns of the region described herein exhibit, at at least one viewing angle, a different CIE (1976) color index parameter and/or a different position of the selective reflection band, said different parameters and/or properties being obtained by using a gravure cylinder having different engravings of at least two, preferably three, different cell characteristics and configurations. By modifying the cylinder engravings, it is possible to locally vary the ink deposit and then to obtain different optical properties after curing of said ink at at least one viewing angle.

As known by those skilled in the art, recessed cells (engravings) of the gravure cylinders may be produced by several different methods. Those methods include without limitation chemical etching, electromechanical engraving and laser engraving.

Prior to chemical etching, all non-printing sections are typically covered with an acid-proof asphalt varnish. Chemical etching processes typically use a pigment paper coated with a sensitized (i.e. made light sensitive) gelatin layer. A crossline screen and an imaging film are exposed onto the pigment paper, said pigment paper being then laminated onto the gravure cylinder. After a developing step, a relief (corresponding to that of the etched cylinder) with gelatin layers of varying thickness forms between the raised cell walls. During the chemical etching process, the cylinder is either bathed in or sprayed with a ferrous chloride solution until the required etching depth is obtained. Chemical etching provides variable depth gravure cylinders. Suitable gravure cylinders for the present invention comprise recessed cells prepared by chemical etching typically having the following characteristics: a screen specification from about 30 l/cm to about 120 l/cm, preferably from about 50 l/cm to about 90 l/cm, and an engraving from about 10 μm to about 100 μm, preferably from about 60 μm to about 90 μm.

Electromechanical engraving uses an electronically-controlled diamond-stylus to cut the cells into the surface of the gravure cylinder, i.e. the size of recessed cell is controlled by the electronics and the dimensions of the diamond-stylus. The original copy is scanned into a computer and digitized. The digital data like the image to be printed, the depth, the screen, the cylinder parameters are transmitted to an oscillating diamond head named stylus; typically the stylus has a shape like an inverted pyramid. Each scanned and digitized image is converted to halftone-like dots, each having an electronic signal, ranging in intensity from 0 to 100%, depending upon the darkness or lightness of the image. The image is then converted back into an analog signal which then drives the engraving head to carve the cell on the cylinder. By varying the electronic current, the signal moves the diamond stylus assembly thus engraving recessed cells to a depth proportional to the signal voltage, i.e. the computer thus controls the engraving head which moves across and around the cylinder, thus engraving cells of varying depths by varying the cylinder penetration of the engraving head. The deeper the diamond stylus penetrated the cylinder, the larger the resulting cells, or in other words, minimal size cells are obtained when the diamond stylus penetrates the cylinder to the slightest degree. The thickness of the cell walls can also be varied; at 100% depth, the diamond-shaped cells interlock with those of the rows on either side of it, with just a tiny cell wall. At 10%, however, the cells are much reduced in size and there is a good deal of space between them. Finally, the last production step of the cylinder comprises the chrome-plating and polishing at the end. Suitable gravure cylinders for the present invention comprise recessed cells prepared by electromechanical engraving have typically the following characteristics: a screen specification from about 40 l/cm to about 140 l/cm, a diamond stylus angle of the inverse pyramid from about 110° to about 150°, typically 120°, and a penetration from about 10% to about 100%. As known by those skilled in the art, the characteristics described hereabove may be fine tuned so as to obtain the desired pattern. With the aim of manufacturing the at least two, preferably at least three, patterns, of the region described herein, said at least two, preferably at least three patterns having different thicknesses and exhibiting, at at least one viewing angle, a different CIE (1976) color index parameter and/or a different position of the selective reflection band, suitable gravure cylinders have recessed cells prepared by electromechanical engraving and have a difference of penetration of the diamond stylus of at least about 10%.

Suitable gravure cylinders for the present invention comprise recessed cells prepared by laser engraving have typically the following characteristics: a screen specification from about 40 l/cm to about 140 l/cm, and a penetration from about 10% to about 100%. As known by those skilled in the art, the characteristics described hereabove may be fine tuned so as to obtain the desired pattern. With the aim of manufacturing the at least two, preferably at least three, patterns, of the region described herein, said at least two, preferably at least three, patterns having different thicknesses and exhibiting, at at least one viewing angle, a different CIE (1976) color index parameter and/or a different position of the selective reflection band, suitable gravure cylinders have recessed cells prepared by laser engraving and having a difference of penetration of the laser of at least about 10%.

The engraving processes described hereabove are further described for example in "Rotogravure and flexographic printing presses, Herbert L. Weiss, Converting Technology Corp., 1985, pages 48-52.

The single cholesteric liquid crystal precursor composition described herein is applied as described above onto a substrate, and subsequently cured to a single cured ink. The substrate described herein may be a transparent substrate or a non-transparent substrate. Suitable substrates for the present invention include without limitation papers or other fibrous materials such as cellulose, paper-containing materials, plastic or polymer substrates, composite materials, metals or metalized materials, glasses, ceramics and combinations thereof. Typical examples of plastic or polymer substrates are substrates made of polypropylene (PP.), polyethylene (PEA), polycarbonate (PC), polyvinyl chloride (PAC) and polyethylene terephthalate (PET). Typical examples of composite materials include without limitation multilayer structures or laminates of paper and at least one layer made of plastic or polymer material.

With the aim of further increasing the security level and the resistance against counterfeiting and illegal reproduction of the optically variable security feature described herein, the substrate described herein may additionally comprise printed, coated, laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of the optically variable security feature described herein, the substrate may comprise one or more marker substances or taggants and/or machine readable substances (e.g. luminescent substances, UV/visible/IR absorbing substances, magnetic substances and combinations thereof).

To generate or reveal color interference effect and strong colorshift effects, layers or coating comprising cholesteric liquid crystal polymers are preferably present directly or indirectly on a light absorbing surface, preferably a sufficiently dark and even preferably a black surface. The term "light absorbing surface" refers to a surface that absorbs at least 50%, preferably at least 60% of the intensity of one or more portions of the visible part of the electromagnetic spectrum (visible spectrum). Said light absorbing surface may be a continuous layer or may be a discontinuous layer in the form of indicia or pattern including without limitation symbols, alpha-numeric symbols, motifs, letters, words, numbers, logos and drawings. The term "light absorbing layer" refers to a layer that absorbs at least part, preferably at least 50%, more preferably at least 60% of the intensity of one or more portions of the visible spectrum of light, preferably to a layer of a dark color, most preferably to a black layer.

Should the substrate of the security elements described herein be a light absorbing surface, no further additional layer or coating is required to easily observe without any machine or device the colorshifting properties of cholesteric liquid crystal polymers. Should the substrate of the security elements described herein not be a light absorbing layer, an additional sufficiently dark and preferably a black background, preferably a layer, may be permanently applied between the substrate and the single cholesteric liquid crystal precursor composition; alternatively, the additional sufficiently dark background or substrate may be applied on the side facing the substrate (i.e. on the opposite side of the single cholesteric liquid crystal precursor composition), said dark background being present permanently or non-permanently. If a dark background is to be employed, the dark background is applied to the substrate, prior to the application of the single cholesteric liquid crystal precursor composition. Therefore, the process according to the present invention may further comprise a step of applying a dark background on the substrate, said step taking place before step a). Typical processes used to apply the dark background include without limitation inkjet, offset, screen printing, flexo printing and rotogravure.

The colorshifting property of a security element comprising cholesteric liquid crystal polymers is considered to be an easy-to-detect overt security feature for the public. Advantageously, any one is able to easily detect, recognize and/or discriminate said security elements or security documents comprising said security elements from their possible counterfeits with the unaided human senses, e.g. such features may be visible and/or detectable while still being difficult to produce and/or to copy. Moreover, the property of reflecting a circularly polarized light of cholesteric liquid crystal polymers may be used as a semi-covert feature which is visible or detectable with the help of a light-polarizing filter. In other words, the property of reflecting a circularly polarized light of cholesteric liquid crystal polymers may be used as an authentication tool for the recognition of security elements comprising cholesteric liquid crystal polymers or security documents comprising said security elements.

The single cholesteric liquid crystal precursor composition comprises (i) one or more nematic compounds A and (ii) one or more chiral dopant compounds B which are capable of giving rise to a cholesteric state of the single cholesteric liquid crystal precursor composition upon heating. The pitch of the obtainable cholesteric state depends on the relative ratio of the nematic and the chiral dopant compounds. The (total) concentration of the one or more nematic compounds A in the single cholesteric liquid crystal precursor composition for use in the present invention is about 4 to about 30, preferably about 4 to about 25, times the (total) concentration of the one or more chiral dopant compounds B. The one or more chiral dopant compounds B described hereabove are preferably present in an amount from about 0.1 wt-% to about 30 wt-%, more preferably from about 0.1 wt-% to about 20 wt-%, and still more preferably from about 3 wt-% to about 10 wt-%, the weight percents being based on the total weight of the single cholesteric liquid crystal precursor composition. The one or more nematic compounds A described hereabove are preferably present in an amount from about 20 wt-% to about 50 wt-%, more preferably in an amount from about 30 wt-% to about 45 wt-%, the weight percents being based on the total weight of the single cholesteric liquid crystal precursor composition.

Both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, an (preferably activated) unsaturated carbon-carbon bond such as for example an acrylate with formula $H_2C=CH-C(O)-O$.

Nematic (precursor) compounds A which are suitable for use in the cholesteric liquid crystal precursor composition are known in the art; when used alone (i.e., without chiral dopant compounds) they arrange themselves in a state characterized by its birefringence. Non-limiting examples of nematic compounds A that are suitable for use in the present invention are described in, e.g., WO 93/22397 A1, WO 95/22586 A1, EP 0 847 432 B1, U.S. Pat. No. 6,589,445, US 2007/0224341. The entire disclosures of these documents are incorporated by reference herein.

A preferred class of nematic compounds A for use in the present invention comprises one or more polymerizable groups, identical or different from each other, per molecule. Examples of polymerizable groups include groups that are capable of taking part in a free radical polymerization, and in particular, groups comprising a carbon-carbon double or triple bond such as for example an acrylate moiety, a vinyl moiety or an acetylenic moiety. Particularly preferred as polymerizable groups are acrylate moieties.

The nematic compounds A for use in the present invention further may comprise one or more optionally substituted aromatic groups, preferably phenyl groups. Examples of the optional substituents of the aromatic groups include those which are set forth herein as examples of substituent groups on the phenyl rings of the chiral dopant compounds of formula (I) such as for example alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (vi) which are indicated below as examples for $A_1$ and $A_2$ in formula (I) (and formulae (IA) and (IB)), typically bonded to optionally substituted phenyl groups.

Non-limiting specific examples of nematic compounds which are suitable for use in the present invention include without limitation the following compounds: 2-methoxy-benzene-1,4-diyl bis[4-({[4-(acryloyloxy)butoxy]carbonyl}oxy)benzoate]; 4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate; 2-methoxybenzene-1,4-diyl bis[4-({[4-(acryloyloxy)butoxy]carbonyl}oxy)-2-methyl-benzoate]; 2-methylbenzene-1,4-diyl bis[4-({[4-(acryloyloxy)butoxy]carbonyl}oxy)-2-methyl-benzoate]; 4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate; 2-methylbenzene-1,4-diyl bis[4-({[4-(acryloyloxy)butoxy]carbonyl}oxy)benzoate]; 2-methylbenzene-1,4-diyl bis[4-({[4-(acryloyloxy)butoxy]carbonyl}oxy)-3-methoxy-benzoate]; 4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate; 2-methylbenzene-1,4-diyl bis[4-({[4-(acryloyloxy)butoxy]carbonyl}oxy)-3,5-dimethoxy-benzoate]; 2-methoxy-benzene-1,4-diyl bis[4-({[4-(acryloyloxy)butoxy]carbonyl}oxy)-3,5-dimethoxybenzoate]; 4-{[4-({[4-(acryloyloxy)butoxy]carbonyl}oxy)-3-methoxybenzoyl]oxy}-2-methoxyphenyl 4-({[4-(acryloyl-oxy)butoxy]carbonyl}oxy)-3,5-dimethoxybenzoate; 4-({4-[4-(acryloyloxy)butoxy]benzoyl}oxy)-3-methylphenyl 4-[4-(acryloyloxy)butoxy]-2-methylbenzoate; 4-({4-[4-(acryloyloxy)butoxy]benzoyl}-oxy)-3-methylphenyl 4-[4-(acryloyloxy)butoxy]-3-methylbenzoate; 2-methylbenzene-1,4-diyl bis{4-[4-(acryloyloxy)butoxy]-2-methylbenzoate}; 4-({4-[4-(acryloyloxy)butoxy]-2-methylbenzoyl}-oxy)-3-methylphenyl 4-[4-(acryloyl-oxy)butoxy]-2,5-dimethylbenzoate; 2-methylbenzene-1,4-diyl bis{4-[4-(acryloyloxy)butoxy]-2,5-dimethylbenzoate}-2-methylbenzene-1,4-diyl bis{4-[4-(acryloyl-oxy)butoxy]benzoate}; 4-({4-[4-(acryloyloxy)butoxy]-3,5-dimethylbenzoyl}oxy)-3-methylphenyl 4-[4-(acryloyloxy)butoxy]-2,5-dimethylbenzoate; 2-methylbenzene-1,4-diyl bis{4-[4-(acryloyloxy)-butoxy]-3,5-dimethylbenzoate}; 2-methoxybenzene-1,4-diyl bis{4-[4-(acryloyloxy)butoxy]-3,5-dimethylbenzoate}; 4-({4-[4-(acryloyloxy)butoxy]-3-methylbenzoyl}oxy)-2-methoxyphenyl 4-[4-(acryloyl-oxy)butoxy]-3,5-dimethylbenzoate; 2-methoxybenzene-1,4-diyl bis{4-[4-(acryloyloxy)-butoxy]-3-methylbenzoate}; 4-({4-[4-(acryloyloxy)butoxy]benzoyl}oxy)-3-methoxyphenyl 4-[4-(acryloyloxy)-butoxy]-3-methylbenzoate; 4-({4-[4-(acryloyloxy)butoxy]benzoyl}oxy)-3-methoxyphenyl 4-[4-(acryloyloxy)-butoxy]-2,5-dimethylbenzoate; 2-methoxybenzene-1,4-diyl bis{4-[4-(acryloyloxy)butoxy]-2-methoxybenzoate}; 2-methoxybenzene-1,4-diyl bis{4-[4-(acryloyloxy)-butoxy]-3,5-dimethoxybenzoate}; 2-methoxybenzene-1,4-diyl bis{4-[4-(acryloyloxy)butoxy]-3-methoxybenzoate}; 2-ethoxybenzene-1,4-diyl bis{4-[4-(acryloyloxy)butoxy]benzoate}; 2-ethoxy-benzene-1,4-diyl bis{4-[4-(acryloyloxy)-butoxy]-2-methylbenzoate}; 2-(propan-2-yloxy)benzene-1,4-diyl bis{4-[4-(acryloyloxy)butoxy]benzoate}; 4-({4-[4-(acryloyloxy)butoxy]benzoyl}oxy)-2-(propan-2-yloxy)phenyl 4-[4-(acryloyl-oxy)butoxy]-2-methylbenzoate; 2-(propan-2-yloxy)benzene-1,4-diyl bis{4-[4-(acryloyloxy)butoxy]-2-methylbenzoate}; 2-(propan-2-yloxy)benzene-1,4-diyl bis{4[4-(acryloyloxy)butoxy]-2,5-dimethyl-benzoate}; 2-(propan-2-yloxy)benzene-1,4-diyl bis{4[4-(acryloyloxy)butoxy]-3,5-dimethyl-benzoate}; and 2-(propan-2-yloxy)benzene-1,4-diyl bis{4[4-(acryloyloxy)butoxy]-3,5-dimethoxy-benzoate}.

The one or more chiral dopant compounds B for use in the present invention preferably comprise at least one polymerizable group. Suitable examples of the one or more chiral dopant compounds B include those of formula (I):

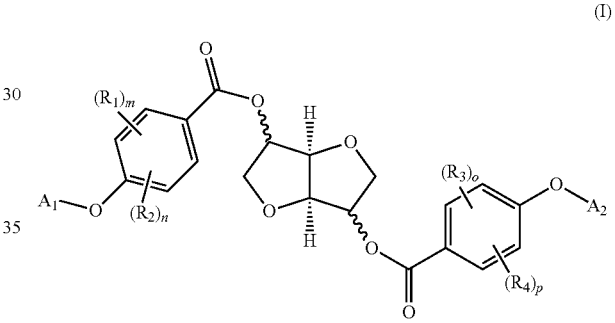

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (vi):

$$—[(CH_2)_y—O]_z—C(O)—CH=CH_2; \qquad (i)$$

$$—C(O)\text{-}D_1\text{-}O—[(CH_2)_y—O]_z—C(O)—CH=CH_2; \qquad (ii)$$

$$—C(O)\text{-}D_2\text{-}O—[(CH_2)_y—O]_z—C(O)—CH=CH_2; \qquad (iii)$$

$$—[COO—(CH_2)_y—O]_z—C(O)—CH=CH_2; \qquad (iv)$$

$$—C(O)\text{-}D_1\text{-}O[COO—(CH_2)_y—O]_z—C(O)— \\ CH=CH_2; \qquad (v)$$

$$—C(O)\text{-}D_2\text{-}O[COO—(CH_2)_y—O]—C(O)— \\ CH=CH_2; \qquad (vi)$$

$D_1$ denotes a group of formula

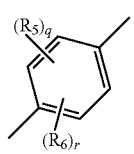

$D_2$ denotes a group of formula

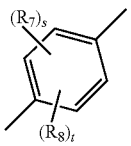

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment, the one or more chiral dopant compounds B may comprise one or more isomannide derivatives of formula (IA):

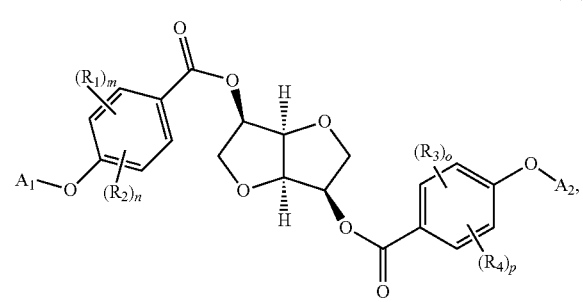

(IA)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (vi):

—[(CH$_2$)$_y$—O]$_z$—C(O)—CH=CH$_2$;   (i)

—C(O)-D$_1$-O—[(CH$_2$)y-O]$_z$—C(O)—CH=CH$_2$;   (ii)

—C(O)-D$_2$-O—[(CH$_2$)y-O]$_z$—C(O)—CH=CH$_2$;   (iii)

—[COO—(CH$_2$)$_y$—O]$_z$—C(O)—CH=CH$_2$;   (iv)

—C(O)-D$_1$-O—[COO—(CH$_2$)$_y$—O]$_z$—C(O)—CH=CH$_2$;   (v)

—C(O)-D$_2$-O[COO—(CH$_2$)$_y$—O]$_z$—C(O)—CH=CH$_2$;   (vi)

$D_1$ denotes a group of formula

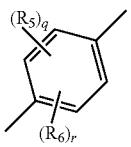

$D_2$ denotes a group of formula

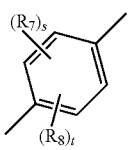

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one exemplary embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another exemplary embodiment of the compounds of formula (I) and of formula (IA), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another embodiment of the compounds of formula (IA) (and of formula (I)), $A_1$ and $A_2$ each independently denote a group of formula —C(O)-D$_1$-O—[COO—(CH$_2$)$_y$—O]$_z$—C(O)—CH=CH$_2$ and/or of formula —C(O)-D$_2$-O—[COO—(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[COO—(CH$_2$)$_y$—O]$_z$—C(O)—CH=CH$_2$ and/or of formula —C(O)-D$_2$-O—[COO—(CH$_2$)$_y$O]—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another embodiment, the one or more chiral dopant compounds B may comprise one or more isosorbide derivatives represented by formula (IB):

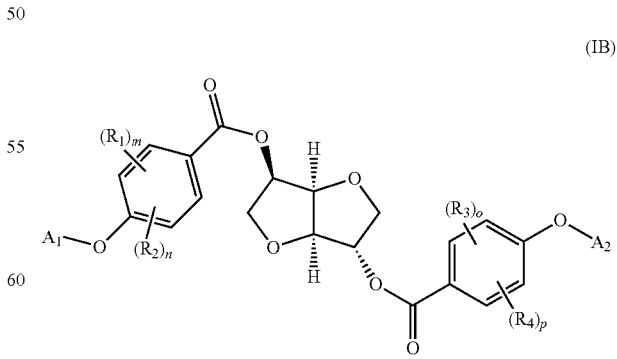

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (vi):

—[(CH$_2$)$_y$-O]$_z$—C(O)—CH=CH$_2$; (i)

—C(O)-D$_1$-O—[(CH$_2$)$_y$-O]$_z$—C(O)—CH=CH$_2$; (ii)

—C(O)-D$_2$-O—[(CH$_2$)$_y$-O]$_z$—C(O)—CH=CH$_2$; (iii)

—[COO—(CH$_2$)$_y$—O]$_z$—C(O)—CH=CH$_2$; (iv)

—C(O)-D$_1$-O—[COO—(CH$_2$)$_y$—O]$_z$—C(O)—CH=CH$_2$; (v)

—C(O)-D$_2$-O—[COO—(CH$_2$)$_y$—O]$_z$—C(O)—CH=CH$_2$; (vi)

$D_1$ denotes a group of formula

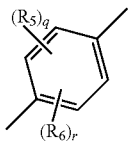

$D_2$ denotes a group of formula

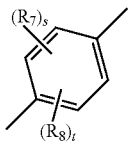

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $R_1$, $R_2$, $R_3$, $R_4$, $R_5$, $R_6$, $R_7$ and $R_8$ in formula (IB) each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $A_1$ and $A_2$ in formula (IB) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; $R_1$, $R_2$, $R_3$, $R_4$, $R_5$, $R_6$, $R_7$ and $R_8$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-D$_1$-O—[COO—(CH$_2$)$_y$—O]$_z$—C(O)—CH=CH$_2$ and/or of formula —C(O)-D$_2$-O—[COO—(CH$_2$)$_y$—O]$_z$—C(O)—CH=CH$_2$; $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $A_1$ and $A_2$ in formula (IB) each independently denote a group of formula —C(O)-D$_1$-O—[COO—(CH$_2$)$_y$—O]$_z$—C(O)—CH=CH$_2$ and/or a group of formula —C(O)-D$_2$-O—[COO—(CH$_2$)$_y$—O]$_z$—C(O)—CH=CH$_2$; $R_1$, $R_2$, $R_3$, $R_4$, $R_5$, $R_6$, $R_7$ and $R_8$ each independently denote $C_1$-$C_6$ alkoxy; and m, n, o, and p each independently denote 0, 1, or 2.

Non limiting examples of chiral dopant compounds B of formula (I) for use in the present invention include without limitation the following compounds: 2,5-bis-O-(4-{[4-(acryloyloxy)-3-methoxybenzoyl]oxy}-3-methoxybenzoyl)-1,4:3,6-dianhydro-D-mannitol; 2-O-(4-{[4-(acryloyloxy)-3-methoxybenzoyl]oxy}-3-methoxybenzoyl)-5-O-(4-{[4-(acryloyloxy)-3-methoxybenzoyl]oxy}-benzoyl]-1,4:3,6-dianhydro-D-mannitol; 2,5-bis-O-(4-{[4-(acryloyloxy)-benzoyl]oxy}-benzoyl)-1,4:3,6-dianhydro-D-mannitol; 2,5-bis-O-(4-{[4-(acryloyloxy)-butoxy]-benzoyl})-1,4:3,6-dianhydro-D-mannitol; 2,5-bis-O-4-(acryloyloxy)-2-methylbenzoyl]-1,4:3,6-dianhydro-D-mannitol; 2,5-bis-O-(4-{[4-(acryloyloxy)-3-methoxybenzoyl]oxy}-benzoyl)-1,4:3,6-dianhydro-D-mannitol; 2,5-bis-O-(4-{[4-(acryloyloxy)-benzoyl]oxy}-3-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol; 2,5-bis-O-(4-{[4-(acryloyloxy)benzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol ; 2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol; 2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol ; 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol ; 2-O-(4-{[4-(acryloyloxy)-2-methoxybenzoyl]-oxy}-2-methoxybenzoyl)-5-O-(4-{[4-(acryloyloxy)-3-methoxybenzoyl]oxy}-2-methoxybenzoyl)-1,4:3,6-dianhydro-D-mannitol; 2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol; 2,5-bis-O-(4-{[4-(acryloyloxy)benzoyl]oxy}-3-methoxybenzoyl)-1,4:3,6-dianhydro-D-mannitol; 2-O-(4-{[4-(acryloyloxy)-2-methoxybenzoyl]

oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol; 2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol; 2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol; 2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol; 2-O-(4-{[4-(acryloyl-oxy)benzoyl]oxy}-2-ethoxy-5-methylbenzoyl)-5-O-(4-{[4-(acryloyloxy)-3-ethoxybenzoyl]oxy}-benzoyl)-1,4:3,6-dianhydro-D-mannitol; 2-O-(4-{[4-(acryloyloxy)benzoyl]oxy}-2-ethoxy-5-methyl-benzoyl)-5-O-(4-{[4-(acryloyloxy)-5-ethoxy-2-methylbenzoyl]oxy}benzoyl)-1,4:3,6-dianhydro-D-mannitol; 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol; 2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol; 2,5-bis-O-(4-{[4-(acryloyloxy)-2,5-dimethylbenzoyl]oxy}-2-ethoxybenzoyl)-1,4:3,6-dianhydro-D-mannitol; 2,5-bis-O-(4-{[4-(acryloyloxy)-2-ethoxybenzoyl]oxy}-2-ethoxybenzoyl)-1,4:3,6-dianhydro-D-mannitol; 2,5-bis-O-(4-{[4-(acryloyloxy)-2-methoxybenzoyl]oxy}-2-ethoxybenzoyl)-1,4:3,6-dianhydro-D-mannitol; 2,5-bis-O-(4-{[4-(acryloyloxy)-2-ethoxybenzoyl]oxy}-2-methoxybenzoyl)-1,4:3,6-dianhydro-D-mannitol; 2,5-bis-O-(4-{[4-(acryloyloxy)-2-ethoxybenzoyl]oxy}-3-methylbenzoyl)-1,4:3,6-dianhydro-D-mannitol; 2,5-bis-O-(4-{[4-(acryloyloxy)-2-ethoxybenzoyl]oxy}-3-methoxybenzoyl)-1,4:3,6-dianhydro-D-mannitol; 2,5-bis-O-(4-{[4-(acryloyloxy)-3-methoxybenzoyl]oxy}-3-methoxybenzoyl)-1,4:3,6-dianhydro-D-glucitol; 2,5-bis-O-(4-{[4-(acryloyloxy)-benzoyl]oxy}-3-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-benzoyl]-oxy}-3-methoxybenzoyl)-1,4:3,6-dianhydro-D-glucitol; 2,5-bis-O-(4-{[4-(acryloyloxy)benzoyl]-oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol; 2-O-(4-{[4-(acryloyloxy)-2,5-dimethylbenzoyl]-oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2,5-bis-O-(4-{[4-(acryloyloxy)benzoyl]oxy}-3-methoxybenzoyl)-1,4:3,6-dianhydro-D-glucitol; 2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol; 2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol; 2-O-(4-{[4-(acryloyloxy)-2-methoxybenzoyl]oxy}-2,5-dimethylbenzoyl)-5-O-(4-}[4-(acryloyloxy)-3-methoxybenzoyl]oxy}-3-methylbenzoyl)-1,4:3,6-dianhydro-D-glucitol; 2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol; 2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]-oxy}-3-methylbenzoyl)-1,4:3,6-dianhydro-D-glucitol; 2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol; 2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol; 2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol; 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol ; 2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol; 2,5-bis-O-(4-{[4-(acryloyloxy)-2,5-dimethylbenzoyl]oxy}-2-ethoxybenzoyl)-1,4:3,6-dianhydro-D-glucitol; 2,5-bis-O-(4-{[4-(acryloyloxy)-2-ethoxybenzoyl]oxy}-2-ethoxybenzoyl)-1,4:3,6-dianhydro-D-glucitol; 2,5-bis-O-(4-{[4-(acryloyloxy)-2-methoxybenzoyl]oxy}-2-ethoxybenzoyl)-1,4:3,6-dianhydro-D-glucitol; 2,5-bis-O-(4-{[4-(acryloyloxy)-2-ethoxybenzoyl]oxy}-2-methoxybenzoyl)-1,4:3,6-dianhydro-D-glucitol; 2,5-bis-O-(4-{[4-(acryloyloxy)-2-ethoxybenzoyl]oxy}-3-methylbenzoyl)-1,4:3,6-dianhydro-D-glucitol; 2,5-bis-O-(4-{[4-(acryloyloxy)-2-ethoxybenzoyl]oxy}-3-methoxybenzoyl)-1,4:3,6-dianhydro-D-glucitol; 2,5-bis-O-4-(acryloyloxy)benzoyl]-1,4:3,6-dianhydro-D-glucitol; 2,5-bis-O-4-(acryloyloxy)benzoyl]-1,4:3,6-dianhydro-D-mannitol; 2,5-bis-O-(4-{[4-({[4-(acryloyloxy)-butoxy]carbonyl}oxy)benzoyl]oxy}-benzoyl)-1,4:3,6-dianhydro-D-glucitol; 2,5-bis-O-(4-{[4-({[4-(acryloyloxy)-butoxy]carbonyl}oxy)-3-methoxybenzoyl]oxy}-benzoyl)-1,4:3,6-dianhydro-D-glucitol; 2,5-bis-O-(4-{[4-({[6-(acryloyloxy)-hexyloxy]carbonyl}oxy)benzoyl]oxy}-benzoyl)-1,4:3,6-dianhydro-D-glucitol; and 2,5-bis-O-[4-({[4-(acryloyloxy)-butoxy]carbonyl}oxy)benzoyl]-1,4:3,6-dianhydro-D-glucitol.

The single cholesteric liquid crystal precursor composition described herein may further comprise one or more coloring components, provided that said one or more machine readable materials do not negatively disturb or interfere with the formation of the helix and/or the formation of the polymer, said one or more coloring components being selected from the group consisting of organic and inorganic pigments, dyes and mixtures thereof, said coloring components absorbing in the visible or invisible region of the electromagnetic spectrum. When present, the one or more coloring components comprised in the single cholesteric liquid crystal precursor composition are preferably present in an amount from about 0.01 to about 5 wt-%, the weight percents being based on the total weight of the single cholesteric liquid crystal precursor composition.

The single cholesteric liquid crystal precursor composition may further comprise one or more machine readable materials, provided that said one or more machine readable materials do not negatively disturb or interfere with the formation of the helix and/or the formation of the polymer. When present, the one or more machine readable materials are preferably selected from the group consisting of magnetic materials, luminescent materials, electrically conductive materials, infrared-absorbing materials and mixtures thereof. As used herein, the term "machine readable material" refers to a material which exhibits at least one distinctive property which is detectable by a device or a machine, such as for example a magnetic detector (when the machine readable security material is a material having magnetic properties) or an IR-camera (when the machine readable security material is a material having IR-absorbing properties), and which can be comprised in a layer so as to confer a way to authenticate said layer or article comprising said layer by the use of a particular equipment for its detection and/or authentication. When present, the one or more machine readable materials comprised in the single cholesteric liquid crystal precursor composition are preferably present in an amount from about 0.01 to about 5 wt-%, the weight percents being based on the total weight of the single cholesteric liquid crystal precursor composition.

The single cholesteric liquid crystal precursor composition described herein may further comprise one or more additives, provided that said one or more additives do not negatively disturb or interfere with the formation of the helix and/or the formation of the polymer, said one or more additives including without limitation compounds and materials which are used for adjusting physical, rheological and chemical parameters of the composition such as the consistency (e.g. anti-settling agents and plasticizers), the foaming properties (e.g. antifoaming agents and deaerators), the lubricating properties (waxes), radiation sensitizers, UV stability (photostabilizers), adhesion properties, surface properties (wetting agents, oleophobing and hydrophobing agents), etc. Additives described herein may be present in one or more inks described herein in amounts and in forms known in the art, including in the form of so-called nanomaterials where at least one of the dimensions of the additives is in the range of 1 to 1000 nm. When present, the one or more additives comprised in the single cholesteric liquid crystal precursor composition are preferably present in an amount from about 0.01 to about 5 wt-%, the weight percents being based on the total weight of the single cholesteric liquid crystal precursor composition.

Since the single cholesteric liquid crystal precursor composition described herein is applied by a rotogravure printing process such as described herein, said composition further comprises one or more solvents so as to adjust its viscosity to a value which is suitable for rotogravure, i.e. a viscosity in the range of about 15 to about 110 s at room temperature according to DIN 53211-4 mm. Suitable solvents are known to those skilled in the art and include without limitation low-viscosity, slightly polar and aprotic organic solvents, such as for example methyl ethyl ketone (MEK), acetone, cyclohexanone, ethyl acetate, ethyl 3-ethoxypropionate, and mixtures of two or more thereof.

Subsequently to the application onto a substrate by rotogravure of the single cholesteric liquid crystal precursor composition described herein, the applied composition is heated so as to be brought to a cholesteric liquid crystal state having specific optical properties. The term "specific optical properties" is to be understood as a liquid crystal state with a specific pitch that reflects a specific wavelength range (selective reflection band). To that end, the single cholesteric liquid crystal precursor composition is heated, the solvent contained in said composition, if present, is evaporated and the promotion of the desired cholesteric liquid crystal state takes place.

The temperature used to evaporate the solvent and to promote the formation of the liquid crystal state depends on the components of the single cholesteric liquid crystal precursor composition and is preferably from about 55° C. to about 150° C., more preferably from about 55° C. to about 120° C., and still more preferably from about 55° C. to about 115° C. Typically, the heating step described herein uses suitable heating sources including without limitation conventional heating means such as hot plates, ovens, streams of hot air and radiation sources such as for example IR lamps. The required heating time depends on several factors such as for example the ingredients of the single cholesteric liquid crystal precursor composition described herein, the type of heating device and the intensity of the heating (energy output of the heating device). Typically, the applied single cholesteric liquid crystal precursor composition is heated for a period of time from about 1 s (second) to 30 s, preferably such as, e.g., not more than about 20 seconds, or not more than about 10 seconds will be sufficient.

Subsequently to the heating step described herein, the applied single cholesteric liquid crystal precursor composition is cured so as to form the region based on single cured ink comprising a cholesteric liquid crystal polymer. Preferably, the curing step is carried out by radiation including infra-red radiation, UV-visible light radiation, electron beam (E-beam) radiation, X-rays, gamma-rays and ultrasonic radiation. More preferably, the curing step is carried out by UV-visible (UV/VIS) light radiation. UV-visible light radiation may be carried out in the presence of one or more photoinitiators comprised in the single cholesteric liquid crystal precursor composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenones, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenylacetic acid 2-[2-oxo-2-phenylacetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-butan-1-one, 2-dimethylamino-2-(4-methyl-benzyl)-1-(4-morpholin-4-yl-phenyl)-butan-1-one and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenylbis(2,4,6-trimethylbenzoyl)-phosphine oxide and also thioxanthone derivatives such as Speedcure ITX (CAS 142770-42-1), Speedcure DETX (CAS 82799-44-8), Speedcure CPTX (CAS 5495-84-1-2 or CAS 83846-86-0). When present, the one or more photoinitiators comprised in the single cholesteric liquid crystal precursor composition are preferably present in an amount from about 0.01 to about 10 wt-%, more preferably from about 0.05 to about 7 wt-%, the weight percents being based on the total weight of the single cholesteric liquid crystal precursor composition.

Alternatively, dual-cure mechanisms may be used. Compositions that cure by dual-cure mechanisms combine thermal drying and radiation curing mechanisms. Typically, compositions suitable for dual-cure mechanisms are similar to radiation curing compositions but include a volatile part constituted by water and/or by solvent. These volatile constituents comprised in the single cholesteric liquid crystal precursor composition are evaporated first using hot air and/or IR driers, and radiation drying, preferably UV-Vis drying, is then completing the curing process.

The thickness of each of the at least two, preferably at least three, patterns of the applied cured ink comprising a cholesteric liquid crystal polymer is independently preferably from about 0.1 to about 12 µm (microns), and more preferably from about 1 to about 7 µm (microns), provided that the at least two, preferably at least three, patterns have different thicknesses. By "different thicknesses", it is meant that the at least two, preferably at least three, patterns have thicknesses differing by at least 10% or 20% depending on the desired design of the region described herein, i.e. depending on the required color and/or colorshifting properties of the least two, preferably at least three, patterns described herein.

The optically variable security feature comprising a region based on a single cured ink comprising a cholesteric liquid crystal polymer and having at least two, preferably at least three, patterns described herein, said at least two, preferably at least three, patterns exhibiting, at at least one viewing angle, a different CIE (1976) color index parameter and/or a different position of the selective reflection band is particularly suitable for the protection of a security document against fraud or illegal reproduction. The term "security document" refers to a document which is usually protected against counterfeit or fraud by at least one security feature. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, entrance tickets and the like. Preferably, the security document described herein is selected from the group consisting of banknotes, identity documents, checks, vouchers, transaction cards, stamps and tax labels and more preferably the security document described herein is a banknote or an identity document. The term "value commercial good" refers to packaging material, in particular for nutraceuticals pharmaceuticals, cosmetics, electronics or beverage and food industry that may comprise one or more security features in order to warrant the content of the packaging like for instance genuine drugs. Example of these packaging material include without limitation labels such as authentication brand labels, tamper evidence labels and seals. The optically variable security feature described herein may be directly applied to the security document described herein. Alternatively, the optically variable security feature security described herein may be in the form of a security thread or a transfer foil. When the optically variable security feature security described herein is in the form of a transfer foil, said transfer foil comprises a substrate and optionally a release layer, wherein said foil can be applied to a security document in a separate transfer step. For example, a transfer foil comprising the optically variable security feature described herein on a transparent substrate such as for example a substrate made of PET, may be applied in a separate transfer step to a security document, such as for example a sufficiently dark and preferably a black substrate of a security document. Should the adhesion between the security document and the optically variable security feature be low, one or more adhesive layers, heat seal lacquers and/or cold seal lacquers, may applied on the security document and/or to the optically variable security feature.

Also described herein are methods for protecting a security document, said methods comprising the step of applying by a rotogravure process with the use of the gravure cylinder described herein the cholesteric liquid crystal precursor composition described herein on a security document such as those described hereabove, preferably selected from the group consisting of banknotes, identity documents, checks, vouchers, transaction cards, stamps and tax labels against counterfeiting or fraud. Also described herein are methods for protecting a security document against counterfeiting or fraud, said methods comprising the step of applying by a rotogravure process with the use of the gravure cylinder described herein the cholesteric liquid crystal precursor composition described herein on an auxiliary substrate such as for example a security thread, security stripe, a foil, a decal, a window or a label, said auxiliary substrate optionally comprising a release layer and/or an adhesive layer, and applying it to or inserting it into a security document such as those described hereabove in a separate transfer step.

Also described herein are methods for manufacturing a security document, said methods comprising the step of providing the security document described herein with the optically variable security feature described herein. According to one embodiment, the methods for manufacturing a security document comprise the steps of a) applying on the security document described herein, by a rotogravure process with the use of the gravure cylinder having at least two, preferably at least three, different engravings described herein, the single cholesteric liquid crystal precursor composition described herein; b) heating the applied composition to bring said composition to a cholesteric liquid crystal state; and c) curing the composition so as to form on the security document a region based on a single cured ink comprising a cholesteric liquid crystal polymer, said region having at least two, preferably at least three, patterns exhibiting, at at least one viewing angle, a different CIE (1976) color index parameter and/or a different position of the selective reflection band. Alternatively, the optically variable security feature described herein is provided as a separate security feature, preferably as a transfer foil or a security thread, and is subsequently applied onto or inserted into the security document Also disclosed herein are methods for manufacturing an optically variable security feature comprising a region based on the single cured ink comprising a cholesteric liquid crystal polymer described herein, said region having at least two, preferably at least three, patterns exhibiting, at at least one viewing angle, a different CIE (1976) color index parameter and/or a different position of the selective reflection band, said methods comprising the steps of: a) applying on the substrate described herein, by a rotogravure process with the use of the cylinder having at least two, preferably at least three, different engravings described herein the single cholesteric liquid crystal precursor composition described herein; b) heating as described herein the applied composition to bring said composition to a cholesteric liquid crystal state; and c) curing as described herein the composition so as to form the optically variable security feature.

A particularly advantageous property of the rotogravure process given by the present invention resides in the ability to provide an easily tunable, controlled and predictable way of printing multi-colored optically variable security features or patterns with a single cholesteric liquid crystal precursor composition in a single printing step, thus reducing the complexity of conventional printing process.

EXAMPLES

The present invention is now described in greater detail with respect to non-limiting examples.

Preparation of the Single Cholesteric Liquid Crystal Precursor Composition

A cholesteric liquid crystal precursor composition was prepared as follows: a chiral dopant compound B1 of formula (I) shown above, i.e. 2,5-bis-O-(4-{[4-(acryloyloxy)-benzoyl]oxy}-benzoyl)-1,4:3,6-dianhydro-D-mannitol (6.00 wt-%) and a nematic compound A, i.e. 2-methylbenzene-1,4-diyl bis{4-[4-(acryloyloxy)butoxy]benzoate} (39.00 wt-%), methyl ethyl ketone (MEK, 26.25 wt-%), cyclohexanone (26.25 wt-%), a photoinitiator (2-dimethylamino-2-(4-methyl-benzyl)-1-(4-morpholin-4-yl-phenyl)-butan-1-one, 1.50 wt-%) and dodecyl vinyl ether (1.00 wt-%) were weighed into a flask, hand stirred with a spatula and thereafter heated at about 50° C. in an oven for about 1 hour until complete dissolution. The so-obtained mixture was cooled to room temperature and filtered (TITAN2® 30 mm filter, 5.0 μm, nylon Membrane, 45025-NN.

Printing of the Single Cholesteric Liquid Crystal Precursor Compositions on a Substrate The single cholesteric liquid crystal precursor composition obtained as described hereabove was independently applied on a) a PET substrate (Hostaphan® RN having a thickness of about 50 μm supplied by Pütz GmbH+Co. Folien KG) and b) a paper substrate (P4/51936 from Gascogne Laminates), comprising a black background which has been applied to said paper by flexo printing (UV-curable ink comprising black pigments, anilox 8.0 cc, 120 L/cm,)60° (hereafter referred as black paper substrate), by rotogravure (TESTACOLOR FTM-145 sold by Norbert Schläfli Engler Maschinen) at a speed of 15±2 m/min.

An optically variable security feature was obtained by using a cylinder which has been electromechanically engraved in the form of a region comprising three patterns (FIG. 1, A, B and C), said cylinder having engravings with three different cells characteristics: engraving A having a screen of 60 l/cm, a diamond stylus angle of an inverse pyramid of 120° and 100% of penetration (these parameters leading to cells depths of about 58 urn); engraving B having a screen of 60 l/cm, a diamond stylus angle of 120° and 80% of penetration (these parameters leading to cells depths of about 50 μm); and engraving C having a screen of 60 l/cm, a diamond stylus angle of 120° and 60% of penetration (these parameters leading to cells depths of about 40 μm).

The so-applied layer was in-line heated with a hot air drying system (tunnel 80 cm long, temperature of about 60° C.) for about 3 seconds so as to evaporate the solvent and to develop a cholesteric liquid crystal phase. The substrate of the so-applied layer had a temperature of about 50° C. when leaving the hot air drying system.

Thereafter, the single cholesteric liquid crystal precursor composition was in-line cured by irradiation with a UV dryer (VCP-20-1 supplied by GEW) comprising a standard mercury UV lamp (160 W) so as to freeze the pitch of cholesteric liquid crystal polymer, such that the optical properties of the resulting cholesteric liquid crystal polymer are no longer depending on external factors such as the temperature. The thickness of the patterns A, B and C of the optically variable security feature obtained as described hereabove was about 6, about 3 and about 2 μm, respectively, said thickness having been measured by using an Extramess Inductive Digital Comparator 2001 (supplied by Mahr).

ΔE Measurement Method According to CIELAB (1976)

The color difference between the three patterns A, B and C was measured and expressed as ΔE CIELAB (1976). $\lambda_{max\ reflectance}$ and ΔE values were measured with a spectrophotometer SF 300 from Datacolor. Measurements were performed a) on three samples comprising the optically variable security feature described hereabove on the PET substrate described hereabove further comprising an external and non-permanently fixed black substrate facing the PET (Black mat Antalis Argovia 80 g/m$^2$) and b) on three samples comprising the optically variable security feature described hereabove on the black paper substrate described hereabove with a dual-beam spectrophotometer with geometry diffuse illuminator/detection at 8° (sphere diameter: 66 mm; BaSO$_4$ coated, light source: pulsed Xenon, filtered to approximate D65 (standard Observer 10°)). $\Delta E^*_{X-Y}$ were calculated as described hereabove:

$$\Delta E^*_{X-Y} = ((L^*_Y - L^*_X)^2 + (a^*_Y - a^*_X)^2 + (b^*_Y - b^*_X)^2)^{1/2}$$

Larger ΔE indicates stronger deviation between the two patterns.

TABLE 1

| Optical characteristics of the optically variable security feature | | | | | |
|---|---|---|---|---|---|
| $\Delta E^*_{A-B}$ | $\Delta E^*_{A-C}$ | $\Delta E^*_{B-C}$ | $\Delta\lambda_{max\ reflectance\ A-B}$ [nm] | $\Delta\lambda_{max\ reflectance\ A-C}$ [nm] | $\Delta\lambda_{max\ reflectance\ B-C}$ [nm] |
| samples a)  >10 | >10 | >4 | >60 | >90 | >30 |
| samples b)  >10 | >10 | >4 | >60 | >90 | >30 |

Samples a) corresponding to the samples comprising the PET and the external and non-permanently fixed black substrate, samples b) corresponding to the samples comprising the black paper substrate (i.e. a black background disposed between the paper substrate and the optically variable security feature), the disclosed values corresponding to the average values obtained from three specimens.

The optically variable feature obtained as described hereabove exhibited the following color properties:

pattern A: colorshift upon variation of the viewing angle from about 90° with respect to the plane of the security feature to a viewing angle of about 22.5° with respect to the plane of the security feature from red to yellow;

pattern B: colorshift upon variation of the viewing angle from about 90° with respect to the plane of the security feature to a viewing angle of about 22.5° with respect to the plane of the security feature from yellow to green; and pattern C: colorshift upon variation of the viewing angle from about 90° with respect to the plane of the security feature to a viewing angle of about 22.5° with respect to the plane of the security feature from green to blue Alternatively, an optically variable security feature was obtained as described hereabove with the exception that the used cylinder has been laser engraved in the form of a region comprising three patterns (FIG. 1, A, B and C), said cylinder having three different cells characteristics: A having a screen of 70 l/cm and a depth of about 33 μm; B having a screen

The invention claimed is:

1. A process for manufacturing an optically variable security feature comprising a region based on a single cured ink comprising a cholesteric liquid crystal polymer, said region having at least two, preferably at least three, patterns exhibiting, at at least one viewing angle, a different CIE (1976) color index parameter and/or a different position of the selective reflection band, said process comprising the steps of:
   a. applying on a substrate, by a rotogravure process with the use of a gravure cylinder having at least two, preferably at least three, different engravings, a single cholesteric liquid crystal precursor composition,
   b. heating the applied composition to bring said composition to a cholesteric liquid crystal state, and
   c. curing the composition so as to form the region based on a single cured ink comprising a cholesteric liquid crystal polymer.

2. The process according to claim 1, wherein the at least two patterns or at least three patterns exhibit, at at least one viewing angle, a difference of a selective reflection band $\Delta\lambda_{max\ reflectance}$ of at least 5 nm, preferably at least 10 nm, and/or a $\Delta E^*_{A-B}$ of at least about 3, preferably at least about 4.

3. The process according to claim 1, wherein the single cholesteric liquid crystal precursor composition comprises (i) one or more nematic compounds A, preferably in an amount from about 20 wt-% to about 50 wt-%, and (ii) one or more chiral dopant compounds B of foimula (I), preferably in an amount from about 0.1 to about 30 wt %, the weight percents being based on the total weight of the single cholesteric liquid crystal precursor composition:

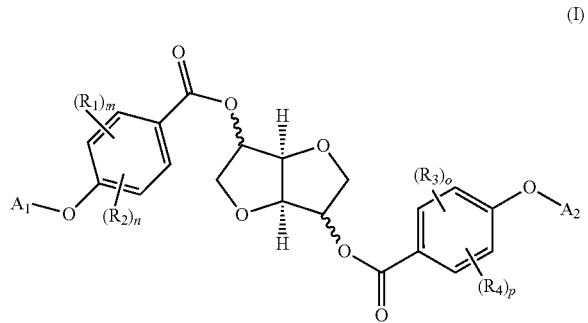

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (vi):

—[(CH$_2$)$_y$—O$_z$—C(O)—CH=CH$_2$     (i);

—C(O)-D$_1$-O—[(CH$_2$)$_y$—O]$_z$—C(O)—CH=CH$_2$     (ii);

—C(O)-D$_2$-O—[(CH$_2$)$_y$—O]$_z$—C(O)—CH=CH$_2$     (iii);

—[COO—(CH$_2$)$_y$—O]$_z$—C(O)—CH=CH$_2$     (iv);

—C(O)-D$_1$-O—[COO—(CH$_2$)$_y$—O]$_z$—C(O)—CH=CH$_2$     (v);

—C(O)-D$_2$-O—[COO—(CH$_2$)$_y$—O]$_z$—C(O)—CH=CH$_2$     (vi);

$D_1$ denotes a group of formula

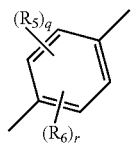

$D_2$ denotes a group of formula

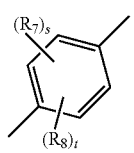

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

4. The process according to claim 1, wherein the applied composition is heated at a temperature from about 55° C. to about 150° C.

5. The process according to claim 1, wherein the curing step c) is carried out by radiation.

6. The process according to claim 1, further comprising a step of applying a dark background on the substrate, said step taking place before step a).

7. The process according to claim 1, wherein the region based on a single cured ink comprising a cholesteric liquid crystal polymer has at least three patterns exhibiting, at at least one viewing angle, a different CIE (1976) color index parameter and/or a different position of a selective reflection band, and the gravure cylinder used at step a has at least three different engravings.

8. The process according to claim 1, wherein the at least two patterns exhibit, at at least one viewing angle, a difference of a selective reflection band $\Delta\lambda_{max\ reflectance}$ of at least 10 nm.

9. The process according to claim 1, wherein the at least two patterns exhibit, at at least one viewing angle, a $\Delta E^*_{A-B}$ of at least 4.

10. The process according to claim 8, wherein the at least two patterns exhibit, at at least one viewing angle, a $\Delta E^*_{A-B}$ of at least 4.

11. The process according to claim 3, wherein the one or more nematic compounds A is/are in an amount from 20 wt-% to 50 wt-%, and the one or more chiral dopant compounds B of formula (I) is/are in an amount from 0.1 to 30 wt %, the weight percents being based on the total weight of the single cholesteric liquid crystal precursor composition.

* * * * *